(12) United States Patent
Morovic et al.

(10) Patent No.: US 11,025,798 B2
(45) Date of Patent: Jun. 1, 2021

(54) ASSOCIATING A COLOR WITH A NEUGEBAUER PRIMARY

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Javier Maestro Garcia, Sant Cugat del Valles (ES); Montserrat Solano Pallarol, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 174 days.

(21) Appl. No.: 16/473,752

(22) PCT Filed: Apr. 19, 2017

(86) PCT No.: PCT/US2017/028324
§ 371 (c)(1),
(2) Date: Jun. 26, 2019

(87) PCT Pub. No.: WO2018/194580
PCT Pub. Date: Oct. 25, 2018

(65) Prior Publication Data
US 2021/0136256 A1 May 6, 2021

(51) Int. Cl.
*H04N 1/60* (2006.01)
(52) U.S. Cl.
CPC ......... *H04N 1/6033* (2013.01); *H04N 1/6008* (2013.01); *H04N 1/6016* (2013.01)
(58) Field of Classification Search
CPC ... H04N 1/6033; H04N 1/6008; H04N 1/6016
See application file for complete search history.

(56) References Cited

U.S. PATENT DOCUMENTS

| 7,137,681 B2 | 11/2006 | Fujimori et al. |
| 7,551,315 B2 | 6/2009 | Hoshii et al. |
| (Continued) | | |

FOREIGN PATENT DOCUMENTS

| CN | 101518047 | 8/2009 |
| CN | 102075665 | 5/2011 |
| (Continued) | | |

OTHER PUBLICATIONS

Wu, Y. et al.; Combine 1D and 3D Color Calibration Methods for Ensuring Consistent Color Reproduction; Jan. 18, 2004; http://proceedings.spiedigitallibrary.org/proceeding.aspx?articleid=836904.

*Primary Examiner* — Ted W Barnes
(74) *Attorney, Agent, or Firm* — HP Inc. Patent Department

(57) ABSTRACT

A computing device receives first data indicating a first metric of a first printed test area and second data indicating a second metric of a second printed test area. The first printed test area is associated with a first plurality of Neugebauer Primaries and each Neugebauer Primary in the first plurality of Neugebauer Primaries is associated with a respective area coverage in the first printed test area. The second printed test area is associated with a second plurality of Neugebauer Primaries, wherein each Neugebauer Primary in the second plurality of Neugebauer Primaries is associated with a respective area coverage in the second printed test area and the second plurality of Neugebauer Primaries is different from the first plurality of Neugebauer Primaries. The computing device generates third data associating a color in a color space with the first plurality of Neugebauer Primaries or the second plurality of Neugebauer Primaries in dependence on the first metric and the second metric.

16 Claims, 11 Drawing Sheets

(56) References Cited

U.S. PATENT DOCUMENTS

| | | | |
|---|---|---|---|
| 7,688,486 B2* | 3/2010 | Gießelmann | H04N 1/6033 358/504 |
| 7,815,275 B2 | 10/2010 | Guo et al. | |
| 9,375,963 B2 | 6/2016 | Humet Pous et al. | |
| 9,706,084 B2* | 7/2017 | Morovic | H04N 1/6033 |
| 9,936,102 B2* | 4/2018 | Morovic | H04N 1/6016 |
| 9,936,104 B2* | 4/2018 | Morovic | H04N 1/6008 |
| 2003/0020727 A1 | 1/2003 | Newman | |
| 2010/0085586 A1* | 4/2010 | Tin | H04N 1/6033 358/1.9 |
| 2011/0310415 A1 | 12/2011 | Mahy et al. | |
| 2015/0172511 A1* | 6/2015 | Matsuzaki | H04N 1/00005 358/3.23 |
| 2016/0034795 A1* | 2/2016 | Morovic | H04N 1/6033 358/1.9 |
| 2016/0034796 A1* | 2/2016 | Morovic | G06K 15/027 358/3.09 |
| 2016/0057314 A1* | 2/2016 | Morovic | H04N 1/00954 358/3.23 |
| 2016/0080608 A1* | 3/2016 | Morovic | H04N 1/00015 358/3.23 |
| 2017/0013174 A1* | 1/2017 | Morovic | H04N 1/6008 |
| 2017/0048420 A1* | 2/2017 | Morovic | H04N 1/6008 |
| 2017/0048421 A1* | 2/2017 | Morovic | H04N 1/6008 |
| 2017/0180610 A1* | 6/2017 | Vande Velde | H04N 1/6058 |
| 2019/0193441 A1* | 6/2019 | Morovic | B41J 29/393 |
| 2019/0238723 A1* | 8/2019 | Morovic | H04N 1/60 |
| 2019/0279054 A1* | 9/2019 | Morovic | H04N 1/00023 |
| 2019/0281191 A1* | 9/2019 | Morovic | H04N 1/6041 |
| 2019/0297225 A1* | 9/2019 | Maestro Garcia | H04N 1/52 |
| 2019/0349498 A1* | 11/2019 | Bai | H04N 1/6013 |
| 2020/0045207 A1* | 2/2020 | Morovic | H04N 1/6033 |

FOREIGN PATENT DOCUMENTS

| | | | | |
|---|---|---|---|---|
| CN | 105103531 | | 11/2015 | |
| CN | 106464775 | | 2/2017 | |
| WO | WO-2015161895 | A1 | 10/2015 | |
| WO | WO-2015161897 | | 10/2015 | |
| WO | WO-2015161897 | A1 * | 10/2015 | H04N 1/6016 |
| WO | WO-2016066226 | A1 | 5/2016 | |
| WO | WO-2016119858 | | 8/2016 | |
| WO | WO-2017184151 | A1 * | 10/2017 | H04N 1/605 |
| WO | WO-2018151719 | A1 | 8/2018 | |

* cited by examiner

ASSOCIATING A COLOR WITH A NEUGEBAUER PRIMARY

BACKGROUND

A printer system may be associated with a color space defined by one or more colorants available to the printer system for deposition or application to a print medium. An example of a colorant color space is the Cyan, Magenta, Yellow, BlacK (CMYK) color space, wherein four variables are used in a subtractive color model to represent respective quantities of colorants. A calibration method may be employed to ensure that the printer system deposits a correct quantity of colorant to accurately represent a given color. Examples of colorants include inks, dyes, pigments, paints, toners and powders.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
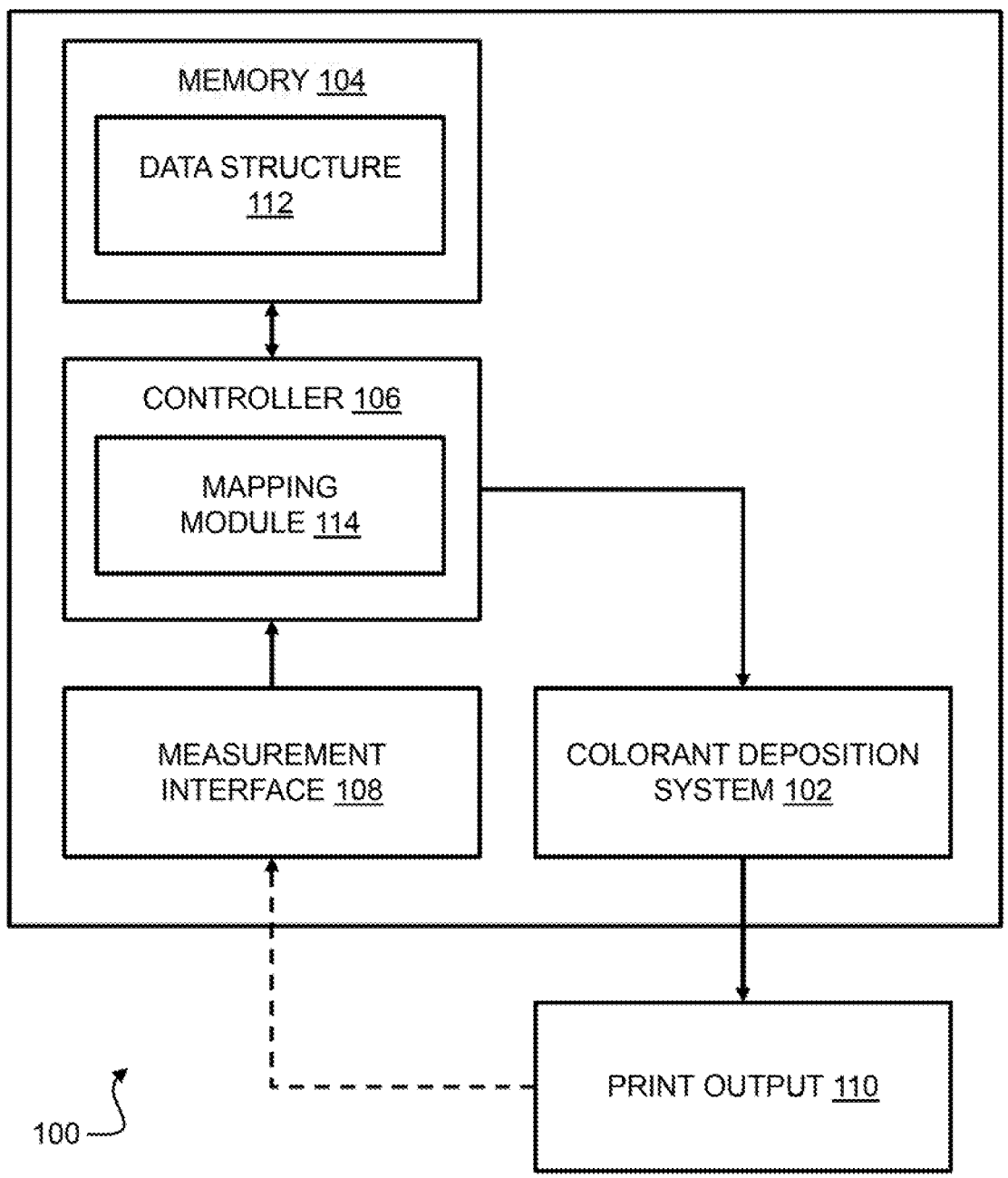
FIG. 1 is a schematic diagram showing a printing system in accordance with an example.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

Although "color" is a concept that is understood intuitively by human beings, it can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon (i.e. dependent on the make-up of the human eye and brain). In this case, a "color" may be defined as a category that is used to denote similar visual perceptions; two colors are said to be similar if they produce a similar effect on a group of one or more people. These categories can then be modelled using a lower number of variables.

A printing system may have a limited number of output channels, such as a limited number of available colorants. As such, color data may be mapped from an input color space (e.g. a color space within which color data for an image is digitally defined in one or more dimensions) to an output color space, defined in terms of the available output channels, that is used to produce the corresponding color. A color mapping may be used to map color data as defined within a print job in the input color space to the output color space.

Within this context, a color space may be defined as a multi-dimensional space, with a point in the multi-dimensional space representing a color value and dimensions of the space representing variables within a color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant (e.g. for a printing system); the International Commission on Illumination (CIE) 1931 XYZ color space, in which three variables ('X', 'Y' and 'X' or tristimulus values) are used to model a color; the CIE 1976 (L*, a*, b*-CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. The NPac color space defines colors in terms for NPac vectors which represent a statistical distribution of one or more Neugebauer Primaries (NPs) over an area of a halftone. In this context, each NP specifies the content of an addressable print location (e.g. a printable "pixel") in the halftone in terms of the output channels available to the printing system (e.g. the colorants available to the printing system). For example, where the printing system provides bi-level control of colorant deposition (e.g. two drop states: "drop" or "no drop"), each NP is one of $2^K$ possible combinations of the K colorants (i.e. K output channels) available to the printing system. For example, a printing system provided with CMY colorants is associated with 8 possible NPs: C, M, Y, CM, CY, MY, CMY, and W, where "W" indicates "white", "blank", or an absence of printing fluid. Thus, a given NP may comprise an overprint of two available colorants, such as a drop of Magenta colorant on a drop of Cyan colorant at each addressable print location.

In further examples, a printing system may provide multi-level control of colorant deposition, according to which the printing system is able to deposit M colorant levels of colorant at each addressable print location. In such examples, the number of output channels available to the printing system is M×K and each NP is one of one of $M^K$ combinations of K colorants available to the printing system. In other words, each drop size may be considered as representing a different output channel for the printing system. Thus, in the example of a tri-level (i.e. M=3) printer (e.g. three drop states: "large drop", "small drop" or "no drop") using CMY printing fluids, the printing system is associated with 27 NPs: c, C, m, M, y, Y, cm, cM, Cm, CM, cy, cY, Cy, CY, my, mY, My, MY, cmy, cmY, cMy, cMY, Cmy, CmY, CMy, CMY, W, where lowercase and uppercase letters are used to differentiate between "small drop" and "large drop" drop weights respectively.

In further examples, a printing system may provide multi-stage deposition of colorants according to N deposition stages (e.g. N page-wide arrays, N print-bars, or N passes) at each addressable print location. In such cases, the number of output channels available to the printer is N×K and each NP is one of $2^{NK}$ combinations of the K colorants available to the printing system. Thus, considering only the cyan colorant in a bi-level printing system comprising three print-bars and using CMY colorant (i.e. N=3), the available Neugebauer Primaries are: $C_1$, $C_2$, $C_3$, $C_1C_2$, $C_1C_3$, $C_2C_3$, $C_1C_2C_3$ and W (where the subscript indicates the print-bar), and the total number of possible Neugebauer Primaries is 512.

In some examples, a printing system may combine multi-level control of both colorant level (e.g. M colorant levels) and deposition stage (e.g. N deposition stages). In such cases, the number of output channels available to the printing system is M×N×K and each NP is one of $M^{NK}$ combinations of the K colorants available to the printing system. In such systems, the number of NPs, and thus the dimensionality of the corresponding NPac color space, available to the printing system may be large.

An NPac vector may be considered as defining a probability distribution of one or more NPs for each addressable print location in the halftone (e.g. a likelihood that a particular NP is to be placed at each pixel in the halftone). Thus, each NPac vector defines a set of halftone parameters that can be used in a halftoning process to map an input color to one or more NPs to be statistically distributed over the plurality of pixels in the halftone. In this respect, the statistical distribution of NPs to addressable print locations in the halftone serves to control the colorimetry and other print characteristics of the halftone. Spatial distribution of NPs according to the probability distribution specified in a corresponding NPac vector may be performed using matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

In printing systems utilizing multi-level and/or multi-stage colorant deposition, the number of available NPs may be large. Consequently, the dimensionality of a corresponding NPac color space is also large. Moreover, the NPac color space may comprise a plurality of NPac vectors which specify deposition of substantially the same colorants but differ in terms to colorant level (e.g. drop-weight) and/or deposition stage (e.g. print-bar). As a result, the colorimetry of such NPac vectors may diverge when printed, due to colorant-colorant interactions, colorant-print medium interactions, and/or the influence of the halftoning process used to generate the halftone. As a result, determining or calibrating a mapping from an input color space to an NPac color space can be complex and time consuming process.

When determining or calibrating a mapping from an input color space to an NPac color space for such printing systems, preference may be given particular print attributes. For example, the print attributes may relate to, amongst others, color constancy, grain, efficient use of colorants, and robustness under a set of conditions. In this respect, the use of area coverage representations enables selection of one NPac from a plurality of NPac which produce substantively the same colorimetry to modify or optimize one or more of these printing attributes. For example, an area coverage representation in the form of an NPac vector may be selected to minimize a change in observed color of an image output when subject to variations in the printing system (i.e. on a basis of increased robustness).

Certain examples described herein relate to determining or calibrating a mapping from an input color space to an NPac color space. The color calibration may involve calibration or generation of a color mapping from a device-dependent color space such as an RGB or CMYK color space, for which a given color value may have a different perceived color when printed by different printing systems, to an NPac color space.

Certain examples described herein relate to determining or calibrating a mapping from an input color space to an NPac color space, according to which the mapping from a given color defined in the input color space is mapped to one of a plurality of possible NPac vectors based on one or metrics associated with the printed out for each of the possible NPac vectors. In this manner, mapping from the input to the NPac color space may be performed in an automated and measurement-based manner, whilst ensuring that the full scope of the NPac color space is utilized in the mapping process.

FIG. 1 shows an example of a printing system 100 for implementation of certain examples described herein. The printing system 100 comprises a colorant deposition system 102, a memory 104, a print controller 106, and a measurement interface 108. The colorant deposition system 102 is provided to deposit a plurality of colorants onto a print medium to produce a print output 110. The print output 110 may, for example, comprise colored printing fluids deposited onto the print medium. In a 2D printing system, the print medium may be paper, fabric, plastic or any other suitable print medium. In a 3D printing system, the print output 110 may comprise a 3D printed object formed from a build material, such as a powder bed comprising, for example, plastic, metallic, or ceramic particles.

In some examples, the colorant deposition system 102 may include a multi-level and/or multi-stage colorant deposition mechanism. For example, the colorant deposition system 102 may comprise a plurality of print-bar or page-wide arrays or one or more print-heads to deposit colorant according to a plurality of passes with respect to the print medium. Moreover, each print-bar, page-wide array or print-head may deposit colorant according to one of more quantized colorant levels. In this respect, when the colorants used by the colorant deposition system comprises printing fluids, the quantized colorant levels may include "no drop", "small drop" and "large drop".

The memory 104 stores a data structure 112 which defines a mapping from the input color space to the NPac color space for the colorant deposition system 102. In some examples, the data structure 112 may comprise a look up table (LUT) 112 to map from the input color space to the NPac color space for the colorant deposition system 102. The look up table may include a plurality of nodes that map colors defined in the input color space to NPac vectors in the NPac color space. In this context, a "node" refers to an entry in the LUT which may be represented as a row with an input color space value and an associated NPac vector value (e.g. an RGB value to NPac array mapping). This row may be stored as an entry in an array in the memory 104 (e.g. in the form of a tuple of data values). A mapping for input color values that do not have matching nodes in the LUT may be implemented by interpolating between nodes in the LUT.

The print controller 106 may comprise a mapping module 114 to control a process for populating or calibrating the data structure 112 for the colorant deposition system 102. In certain examples, the mapping module 114 populates or calibrates the data structure 112 on the basis of one or more metrics determined from each of a plurality of test areas printed by the colorant deposition system 102, as described below in more detail.

The print controller 106 may be implemented by one or more instructions executed by a processor. The processor may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The processor may also be implemented as a combination of computing devices, such as a combination of a DSP and a microprocessor, a plurality of microprocessors, one or more microprocessors in conjunction with a DSP core, or any other such configuration.

Population of the data structure 112 stored in the memory 104 may be performed by printing a plurality of test areas or "patches" which approximate a given color in the input space using the colorant deposition system 102, and mapping the given color to an NPac vector corresponding to the test area in the plurality of test areas based on a metric determined from the printed test areas. In this respect, the metric may be determined on the basis of one or more measured properties of the plurality of test areas. In particular, the mapping module 114 may obtain a first metric for a first printed test area associated with a first NPac vector and a second metric for a second printed test area associated with a second NPac vector which is different from the first NPac vector. Based on the first and second metrics, the mapping module 114 may associate a color in a color space with either the first NPac vector or the second NPac vector, and store this association in the data structure 112. To perform this mapping process, the print controller 106 may retrieve test data (not shown) defining the plurality of test areas from the memory 104. In this context, the test data may specify a plurality of NPac vectors represented in the NPac color space, which the print controller 106 uses to control the colorant deposition system 102 to generate the print output 110 comprising the plurality of test areas. The print controller 106 may employ a halftoning process to generate control data for the colorant deposition system, based on the received NPac vectors.

The measurement interface 108 is provided to receive an indication of a measured property of a plurality of test areas in the print output 110. The measurement interface 108 may transmit information regarding the measured property for the plurality of test areas to the mapping module 114. The mapping module may generate a metric based on the measured property and store the generated metric in the memory 104 for subsequent use in calibrating or populating the data structure 112. In certain examples, the measurement interface 108 is configured to receive input from a color measurement device, such as, amongst others, a tristimulus colorimeter, a spectrocolorimeter or a spectrophotometer. In further examples, the measurement interface 108 is configured to receive data representing a digital image of the printed test areas for subsequent processing by the mapping module 114. In other examples, the measurement interface 108 may retrieve data representing the measured property from a memory, such as memory 104 or another coupled storage device or from a user interface.

The mapping module 114 receives data representing the measured property for the plurality of test areas and calculates a respective plurality of metrics for use in the mapping process. For example, the mapping module 114 may determine a metric which is indicative of the degree of side-by-side printing (i.e. colorant deposition in adjacent pixels) for each of the plurality of test areas. Other metrics may include metrics which provide an indication of the grain for each test area or metrics which provide an indication of the colorant usage for each test area. In some examples, a plurality of metrics may be combined to provide a single "overall" metric for each of the plurality of test areas. The mapping module 114 uses the determined metrics to select a test area from the plurality of test areas to map to an input color, and updates a corresponding node in the data structure 112 to store the mapping in terms of an NPac vector corresponding to the selected test area.

Figure 2:
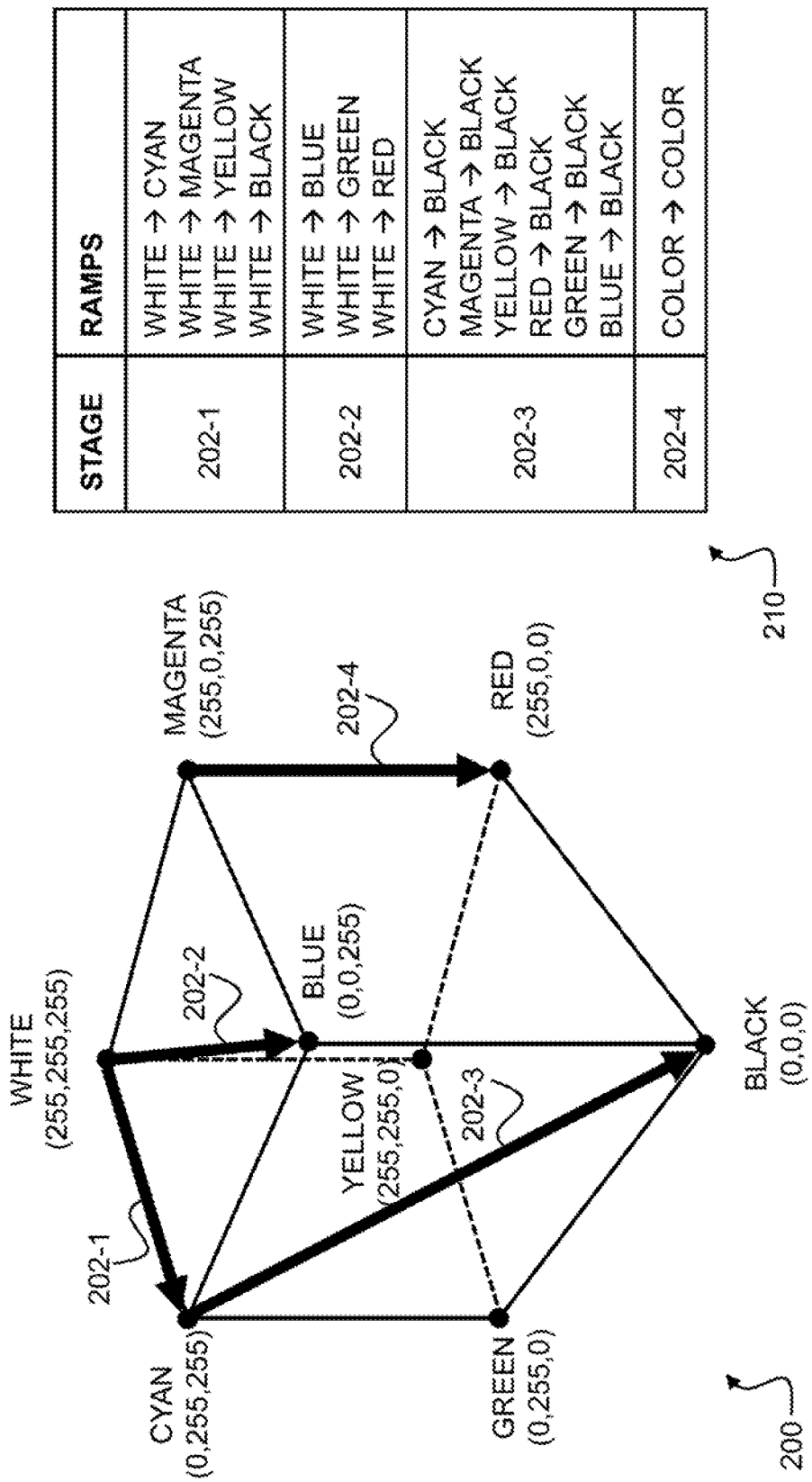
FIG. 2 is a schematic diagram showing a mapping process in accordance with an example.

In certain examples, the mapping module 114 may perform a sequence of mapping processes to populate the mapping data structure 114. In particular, the mapping module 114 performs a sequence of mapping processes to build a mapping from the input color space to the NPac color space. An example of this sequence is shown in FIG. 2 with respect to an RGB color space 200 and an NPac color space defined in terms of CMYK colorants. In this example, the RGB color space 200 is defined as an 8-bit color space, with each of the dimension of the color space taking a value between 0 and 255. The RGB color space 200 takes the form of a cube, with each vertex of the cube representing a primary color in the RGB color space 200 (i.e. red, green and blue) or a secondary color in the RGB color space 200 (i.e. cyan, magenta and yellow), in addition to black and white. Thus, the RGB color space comprises $256^3$ or approximately 16.8 million possible input colors, although the data structure 114 may comprise mappings for only a subset of the possible input colors and an interpolation process may be utilized to determine mappings for input colors note defined in the data structure 112.

The mapping process 114 builds a mapping from colors defined in the RGB color space 200 to NPac vectors defined in the NPac color space by performing an initial mapping processes to build a "framework" or "skeleton" of mappings for subsequent use in an interpolation process. For example, the initial mapping process may populate nodes in the cube which are located on one or more edges, face diagonals or space diagonals of the cube, thereby providing boundary conditions for subsequent use in the interpolation process. In some examples, the initial mapping process may include a plurality of sub-processes, as represented by arrows 202-1 to 202-4 and with reference to table 210 in FIG. 2. These sub-processes may be summarized as follows:

Sub-process 1: Populate nodes which correspond to color ramps from white to each of the primary colors in the NPac color space (i.e. cyan, magenta, yellow and black for an NPac space defined in terms of CMYK colorants). With reference to the color space 200 of FIG. 2, this sub-process comprises populating the three edges 202-1 (only one shown in FIG. 2 for clarity) and the body diagonal (not shown in FIG. 2) of the color space 200 which comprise the vertex corresponding to white.

Sub-process 2: Interpolate between the color ramps generated in the first sub-process to populate the nodes which correspond to color ramps from white to each of the secondary colors in the NPac color space (i.e. red, green and blue). With reference to the color space 200 of FIG. 2, this sub-process comprises populating the three face diagonals 202-2 (only one shown in FIG. 2 for clarity) which comprises the vertex corresponding to white.

Sub-process 3: Interpolate between the color ramps generated in stage 1 and stage 2 to populate the nodes which correspond to the color ramps from black to each of cyan, magenta, yellow, red, green and blue. With reference to the color space 200 of FIG. 2, this stage comprises populating the three edges 202-4 (only one shown in FIG. 2 for clarity) and three face diagonals (not shown in FIG. 2) of the color space 200 which comprise the vertex corresponding to black.

Sub-process 4: Interpolate between the color ramps generated in stage 1, stage 2 and stage 3 to populate the color to color ramps. With reference to the color space 200 of FIG. 2, this stage comprises populating the six edges 202-4 (only one shown in FIG. 2 for clarity) which do not comprise a vertex corresponding to either white or black.

Once the framework of mappings from the RGB color space to the NPac color space have been determined according to the above process, mapping for remaining nodes in the RGB color space can be determined using an interpolation process applied to the NPac vectors determined for each of the nodes in the framework. This interpolation process may be implemented using a multivariate or spatial interpolation process, such as a trilinear interpolation process or a tricubic interpolation process.

Figure 3:
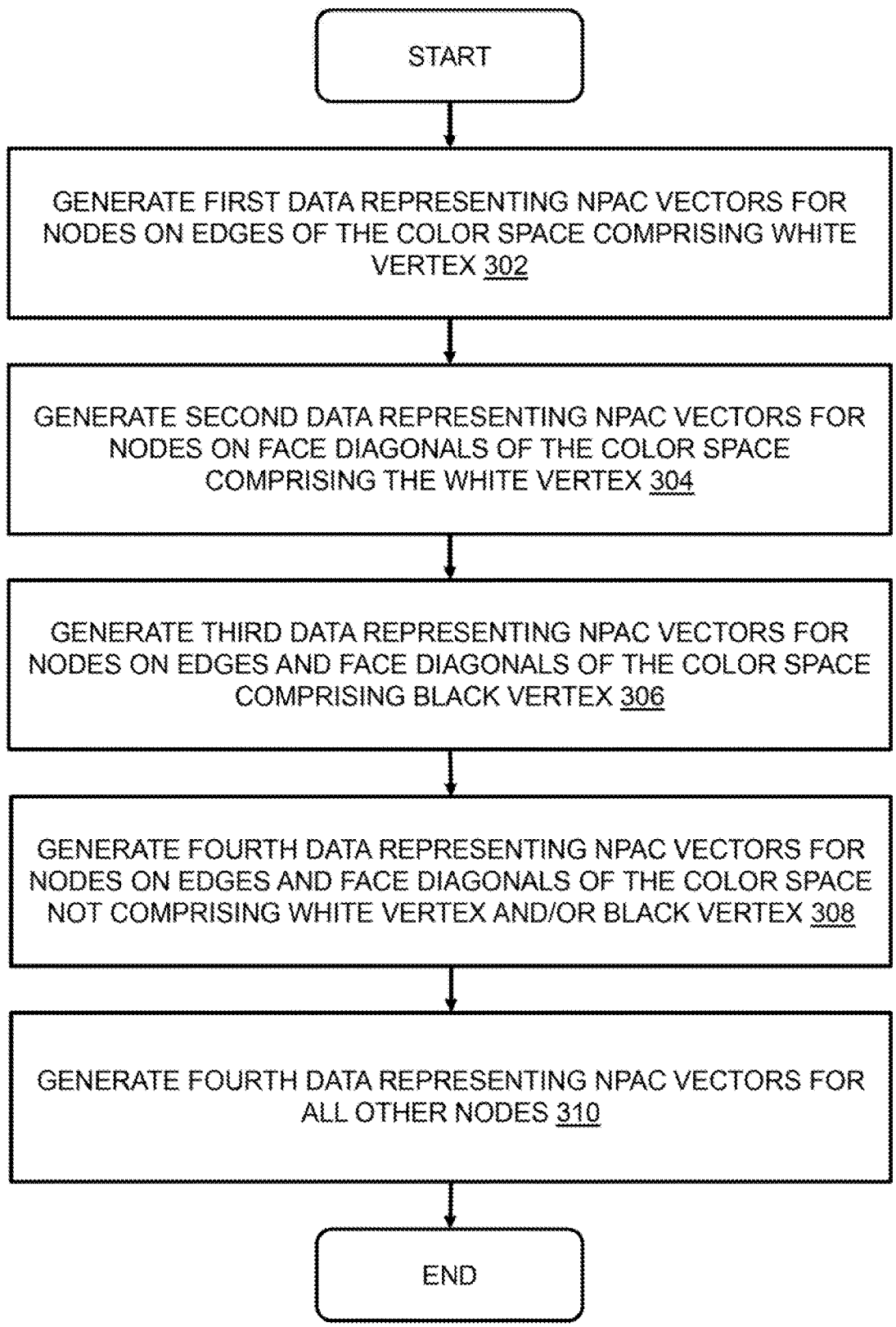
FIG. 3 is a flow chart showing a method of populating a color space mapping in accordance with an example.

The process described above with reference to FIG. 2 may be extended to an input color space comprising more than three dimensions. Similarly, the NPac color space may be associated with fewer or greater number of colorants than the CMYK example provided above. In this respect, FIG. 3 shows a method 300 of generating a mapping between a generalized multi-dimensional input color space and a generalized NPac color space, which may be implemented by the mapping module 114 of FIG. 2.

According to the method 300, the mapping module 114 generates first data representing a first plurality of NPac vectors for a first plurality of nodes in a multi-dimensional color space, wherein the first plurality of nodes are located on a first plurality of edges of the multi-dimensional color space and each edge in the first plurality of edges comprise a first vertex in the multi-dimensional color space which represents white (block 302). In cases where the NPac color space is associated with a black colorant, the first plurality of NPac vectors may also include NPac vectors for nodes located on a body diagonal of the multi-dimensional color space which comprises the first vertex and a second vertex in in the multi-dimensional color space which represents black. Based on the first data, the mapping module 114 generates, second data representing a second plurality of NPac vectors for a second plurality of nodes in the multi-dimensional color space, wherein the second plurality of nodes are located on a first plurality of diagonals of the multi-dimensional color space and each diagonal in the first plurality of diagonals comprises the first vertex in the multi-dimensional color space which represents white (block 304). Based on the first data and the second data, the mapping module 114 generates third data representing a third plurality of NPac vectors for a third plurality of nodes in the multi-dimensional color space, wherein the third plurality of nodes are located on a second plurality of edges of the multi-dimensional color space and each edge in the second plurality of edges comprises a second vertex in the multi-dimensional color space which represents black (block 306). In some examples, the third plurality of NPac vectors may include nodes located on a second plurality of diagonals of the multi-dimensional color space, wherein each diagonal in the second plurality of diagonals comprises the second vertex in the multi-dimensional color space. Based on the first data, the second data and the third data, the mapping module 114 generates fourth data representing a fourth plurality of NPac vectors for a fourth plurality of nodes in the multi-dimensional color space, wherein the fourth plurality of nodes are located on a third plurality of edges of the multi-dimensional color space, and wherein each edge in the third plurality of edges does not comprise the first and/or second vertices (block 308). Finally, the method comprises interpolating between first, second, third and fourth pluralities of NPac vectors to determine NPac vectors for all remaining nodes in the multi-dimensional color space (block 310).

Further details of the processes performed by the mapping module 114 to populate the mapping stored in the data structure 112 will now be described with reference to the examples shown in FIGS. 4 to 10. In these examples, the input color space is the RGB color space as shown in FIG. 2, and the NPac color space is associated with CMYK colorants which are deposited by the colorant deposition system 102 according to three print-bars (i.e. three deposition stages).

Figure 4:
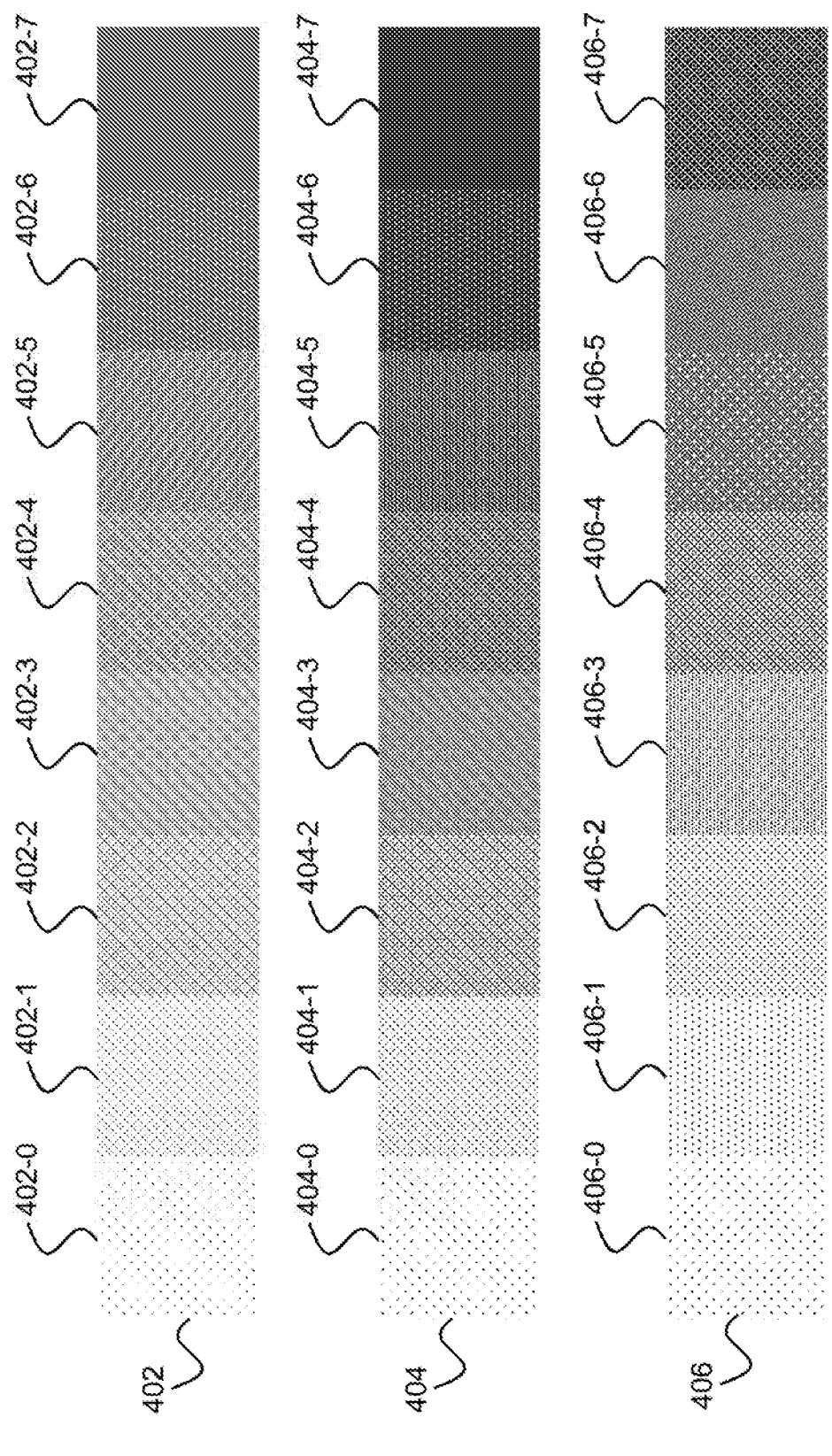
FIG. 4 is a schematic diagram showing a plurality of color ramps in accordance with an example.

FIG. 4 shown an example of a plurality of test areas 400 printed by the colorant deposition system 102 for use in populating nodes in the data structure 112 corresponding to the white to cyan edge 202-1 of the color space 200 shown in FIG. 2 (i.e. sub-process 1). The test areas 400 comprise a first color ramp 402 (comprising patches 402-0 to 402-7), a second color ramp 404 (comprising patches 404-0 to 404-7) and a third color ramp 406 (comprising patches 406-0 to 406-7), which are generated by varying the area coverage of a respective plurality of NPs comprising only the cyan colorant. In other words, each patch in the first color ramp 402 corresponds to a NPac vector specifying different area coverages of a first plurality of NPs; each patch in the second color ramp 404 corresponds to a NPac specifying different area coverages of a second plurality of NPs; and each patch in the third color ramp 406 corresponds to a NPac specifying different area coverages of a third plurality of NPs. In this example, the first color ramp 402 is generated by varying the area coverage of the single print-bar NPs (i.e. $C_i$); the second color ramp 404 is generated by varying the area coverage of the two print-bar NPs (i.e. $C_iC_j$); and the third color ramp 406 is generated by varying the area coverage of the three print-bar NPs (i.e. $C_iC_jC_k$), where i, j and k are indices referring to the plurality print-bars available to the colorant deposition system 102.

In some examples, the test areas 400 may be generated by taking into account the maximum colorant that can be deposited for the halftone. For example, where the cyan colorant is a printing fluid with 3 ng drop weight and the halftone is associated with a 6 ng printing fluid limit, the first color ramp 402 and the second color ramp 404 for the single print-bar NPs and the two print-bar NPs may reach 100 percent area coverage without exceeding the printing fluid limit (i.e. patches 402-7 and 404-7 respectively). In contrast, the third color ramp 406 will not reach 100 percent area coverage because to do so would exceed the printing fluid limit (i.e. in patch 406-7).

Once the color ramps 402, 404 and 406 have been printed by the colorant deposition system 402, each patch is measured and a respective metric is determined by the mapping module 114. As discussed above, the metric may be indicative of the degree of side-by-side printing (i.e. colorant deposition in adjacent pixels) for each of the plurality of patches. For example, a first NPac vector specifying the C1 and C2 NPs results in a halftone with side-by-side printing, whereas a second NPac vector specifying the C1C2 NP results in a halftone with overprinting (i.e. no side-by-side printing) in pixels of the halftone. Other metrics may include metrics which provide an indication of the grain for each test area or metrics which provide an indication of the colorant usage for teach test area.

Once the metrics have been calculated for each patch in the color ramps 402, 404 and 406, the mapping module 114 extracts or selects a plurality of patches, based on the calculated metrics, to combine to form a composite color ramp. For example, where the calculated metric is indicative of the degree of side-by-side printing, the mapping module may select a plurality of patches which maximize the metric at each position in the composite color ramp. In other words, for each area coverage in the composite color ramp, the mapping module 114 may select a patch from the color ramps 402, 404 and 406 which optimizes a desired property.

Figure 5:
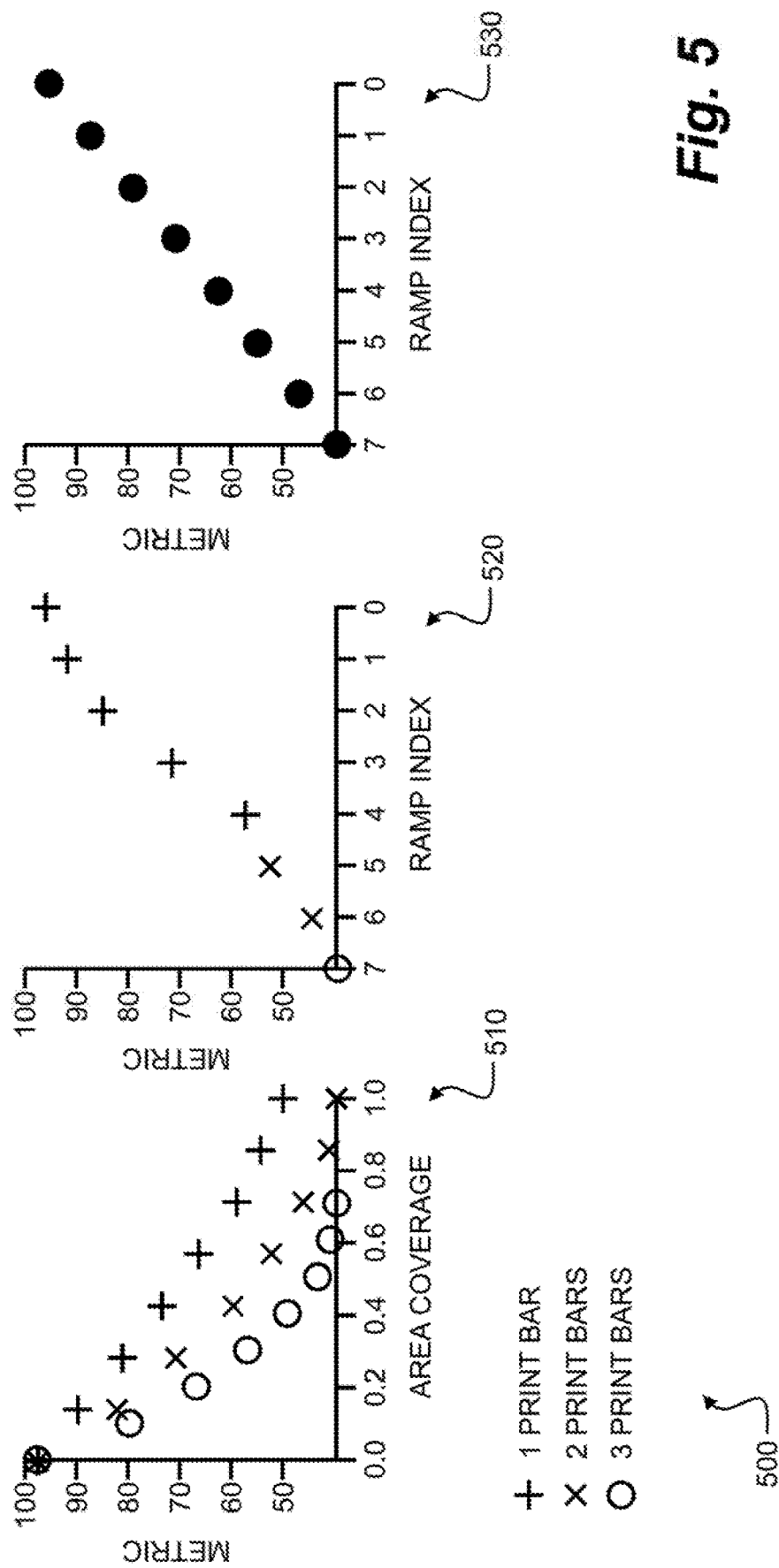
FIG. 5 is a schematic diagram comprising a plurality of plots showing a metric for a plurality of color ramps in accordance with an example.

The selection process performed by the mapping module 114 is now described in more detail with reference to Figure S. In this respect, FIG. 5 shows a series of plots of the metrics determined for the color ramps 402, 404 and 406 described above with reference to FIG. 4. A first plot shows the measured metric for each of the patches in the single print-bar color ramp 402 (plotted using the "+" symbol), the two print-bar color ramp 404 (plotted using the "x" symbol), and the three print-bar color ramp 406 (plotted using the "o" symbol). A second plot 520, shows the calculated metrics for each of the patches selected by the mapping module 114 to form the composite color ramp. From this second plot 520, it can be seen that the composite color ramp comprises five patches from the single print-bar color ramp 402 (i.e. patches 402-0 to 402-4), two patches from the two print-bar color ramp 404 (i.e. patches 404-5 and 404-6), and one patch from the three print-bar color ramp 404 (i.e. patch 406-7).

In some examples, linear variation in NPac color space may not correspond to perceptually uniform variation in a printed image. In this context, perceptually uniform means that a change of the same amount in a color value should produce a change of about the same visual importance. For example, equal intervals of area coverage may not equate to visually equidistant intervals in a printed output. Thus, in some examples, the mapping module 114 may implement a linearization process to linearize the composite color ramp in NPac space on the basis of a particular characteristic. For example, the mapping module 114 may consider the range of the composite color ramp in chroma terms (i.e. in the CIE 1976 color space) and then resample the selected patches in lightness terms (i.e. L*terms). Alternatively, where the composite color ramp corresponds to the white to black color ramp, the mapping module 114 may consider the range of the composite color ramp in lightness terms, before resampling the selected patches in lightness terms (i.e. L*terms). In other examples, the selected patches may be resampled in b in the CIELAB color space, or chroma in the CIELCh color space. A second plot 530 in FIG. 5 shows the result of this linearization process as applied to the composite color ramp generated on the basis of the test area 400 shown in FIG. 4.

Figure 6:
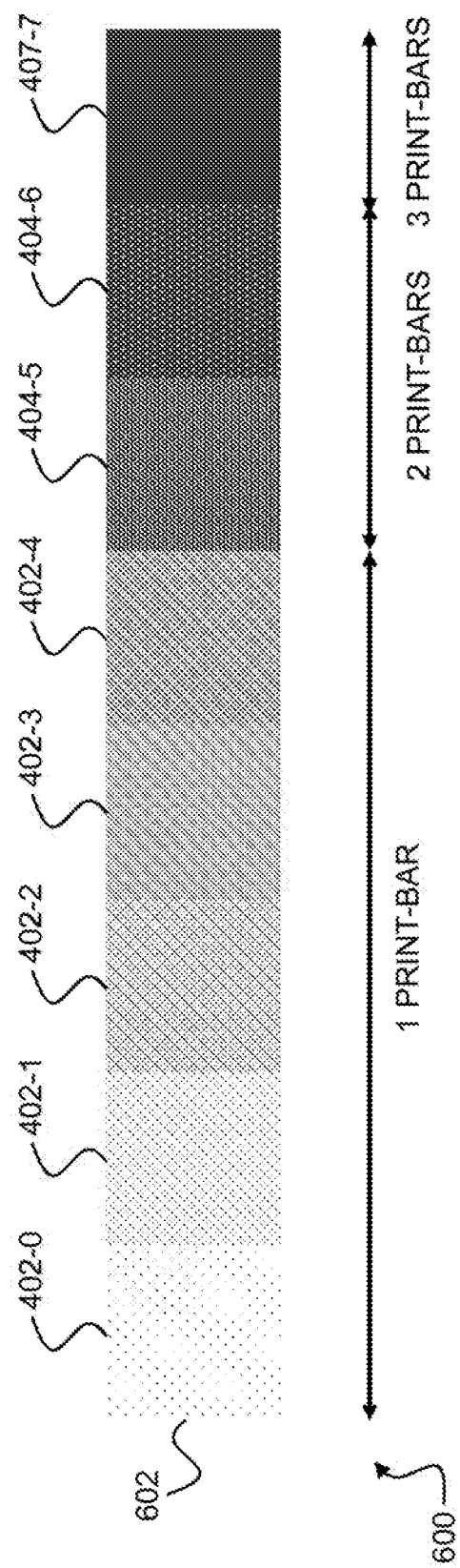
FIG. 6 is schematic diagram showing a composite color ramp in accordance with an example.
Figure 7:
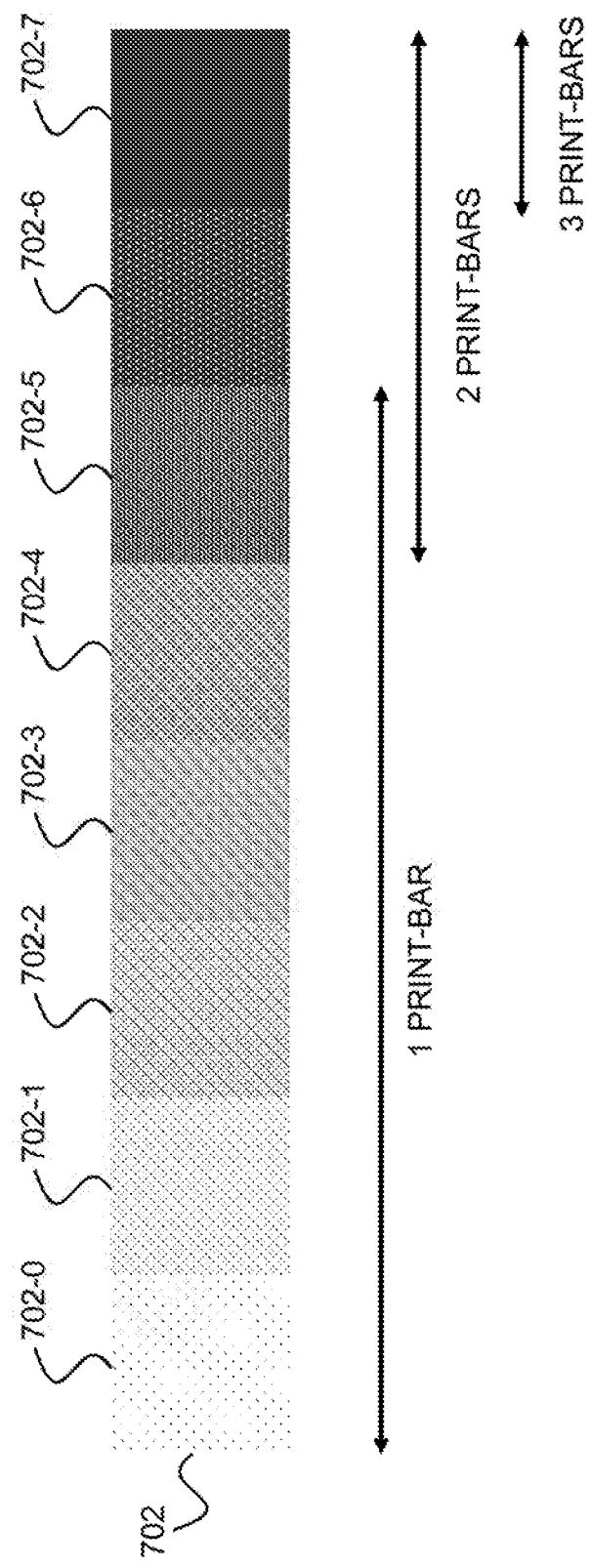
FIG. 7 is schematic diagram showing a linearized composite color ramp in accordance with an example.

In some examples, the linearization process performed by the mapping module 114 may result in patches comprising a combination of the one print-bar NPs, the two print-bar NPs and/or the three print-bar NPs. In other words, the result of the linearization process is a set of patches which are interpolated from the patches forming the composite color ramp. In this respect, FIG. 6 shows an example of a composite color ramp 602 generated on the basis of the first, second and third color ramps 402, 404 and 406 of FIG. 4. As shown in FIG. 6, the composite color ramp comprises the selected patches 402-0, 402-1, 402-2, 402-3, 402-4, 404-5, 404-6, 406-7 from the first, second and third color ramps 402, 404 and 406. Thus, it is evident that each of the patches includes either one print-bar NPs, two print-bar NPs or three print-bar NPs, without any "overlapping". FIG. 7 shows an example of a linearized color ramp 702, resulting from the linearization process performed by the mapping module 114, as described above. In this respect, the linearized color ramp 702 comprises a plurality of patches 702-0 to 702-7 which are determined on the basis of an interpolation to ensure uniform transition in lightness terms. From this example, it is evident that this interpolation process has introduced an overlapping between the one print-bar NPs, the two print-bar NPs and the three print-bar NPs. Specifically, patch 702-5 comprises both one print-bar NPs and two print-bar NPs, and patch 702-7 comprises both two print-bar NPs and three print-bar NPs.

FIGS. 4 to 7 have been described with reference to generation of a linearized color ramp for the white to cyan color ramp. However, the same principles can be applied to generating color ramps for other primary colors in the NPac color space (e.g. magenta, yellow and black). Similarly, the techniques discussed above with reference to FIGS. 4 to 7 may also be applied to NPac color spaces for printing systems which provide multi-level colorant deposition. In such examples, the plurality of printed test areas may comprise a plurality of color ramps corresponding to NPs of differing drop-weight. In this respect, the corresponding composite color ramp may include patches corresponding to NPs which specify the same colorant according to different drop-weights.

Figure 8:
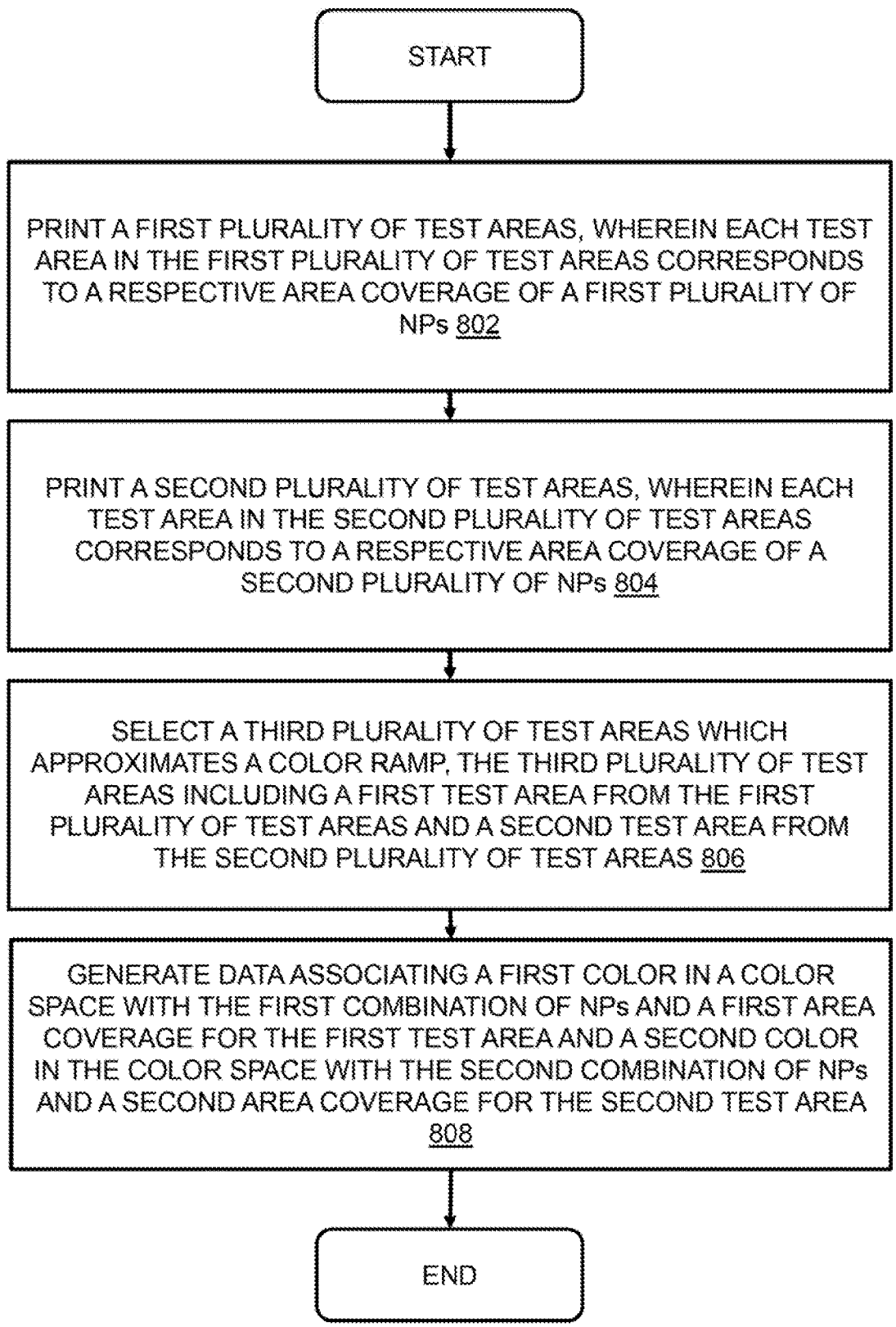
FIG. 8 is a flow chart showing a method of generating a color space mapping in accordance with an example.

The techniques described above with reference to FIGS. 4 to 7 may be employed by the mapping module 114 to populate nodes in the data structure 112. In this respect, FIG. 8 shows an example of a method 800 performed by the mapping module 114 to populate a plurality of nodes in the data structure 112 corresponding to a particular color ramp. The method 800 comprises printing, with a printing system, a first plurality of test areas, wherein each test area in the first plurality of test areas corresponds to a respective area coverage of a first NP (block 802), and printing, with the printing system, a second plurality of test areas, wherein each test area in the second plurality of test areas corresponds to a respective area coverage of a second NP, the second NP being different from the first NP (block 804). Next, the method proceeds to selecting, from the first plurality of test areas and the second plurality of test areas, a third plurality of test areas which approximates a color ramp, wherein the third plurality of test areas includes a first test area from the first plurality of test areas and a second test area from the second plurality of test areas (block 806). After selection of the third plurality of test areas, the method proceeds to generating data associating a first color in a color space with the first NP and a first area coverage corresponding to the first test area and a second color in the color space with the second NP and a second area coverage corresponding to the second test area (block 808).

According to some examples, the third plurality of test areas is selected from the first plurality of test areas and the second plurality of test areas based on a measured property of each test area in the first plurality of test areas and the second plurality of test areas. According to some examples, the measured property is a halftone characteristic of each test area in the first plurality of test areas and the second plurality of test areas.

According to some examples, the first NP and the second NP may each specify a colorant deposition stage in a plurality of colorant deposition stages for deposition of a colorant. For example, each colorant deposition stage in the plurality of colorant deposition stages may correspond to a respective print-bar in a plurality of print-bars, a respective page-wide array in a plurality of page-wide arrays, or a respective pass in a plurality of passes.

According to some examples, the first NP and the second NP may specify a colorant deposition level in a plurality of colorant deposition levels for deposition of a colorant. For example, each colorant deposition level in the plurality of colorant deposition levels corresponds to a respective drop-weight in a plurality of drop-weights available to print head, a print-bar, a page-wide array, or any other mechanism for deposition of a printing fluid.

According to some examples, the method may comprise applying a linearization process to the third plurality of test areas to determine the first area coverage and the second area coverage. For example, the linearization process may comprise linearizing a lightness characteristic of each test area in the third plurality of test areas to determine the first area coverage and the second area coverage. The linearization process may be performed in an NPac color space associated with the first and second NPs.

Figure 9:
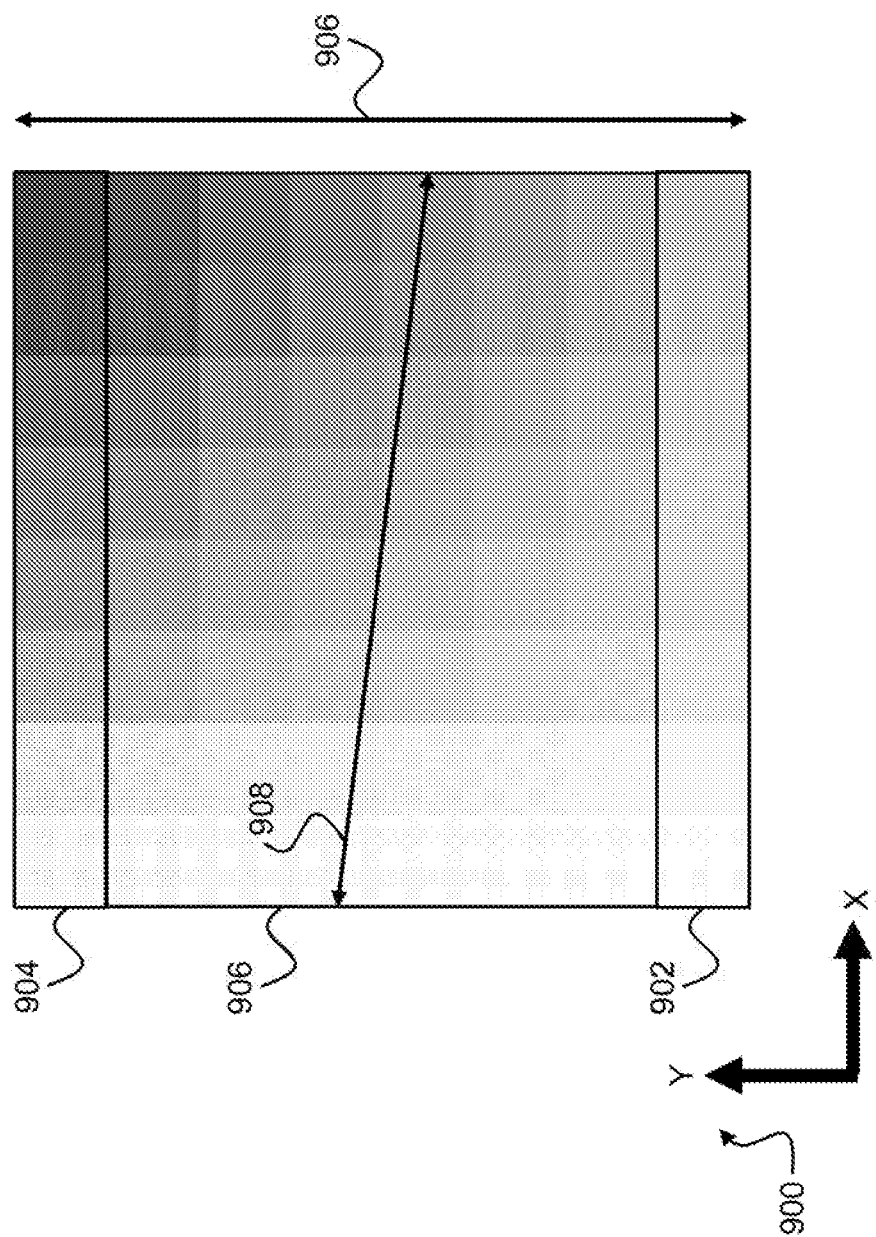
FIG. 9 is a schematic diagram showing a plurality of color ramps in accordance with an example.

FIG. 9 shows an example of a plurality of test areas 900 printed by the colorant deposition system 102 for use in populating the white to blue edge 202-2 of the color space 200 shown in FIG. 2 (i.e. sub-process 2). The test areas 900 comprise a linearized white to cyan ramp 902 and a linearized white to magenta ramp 904 generated according to the techniques described above with reference to FIG. 4 to 7 (i.e. sub-process 1). The mapping module 114 performs an interpolation process to generate a plurality of intermediate color ramps 906 which transition from the white to cyan ramp 902 to the white to magenta ramp 904. In this respect, the interpolation may be performed in the NPac color space by interpolating between the NPac area coverages at the end points provided by the white to cyan ramp 902 and the white to magenta ramp 904. As a result, the test areas 900 represent an area which varies in terms of lightness (e.g. L*) in the X direction and varies according to an equally spaced area coverage convex combination of the NPacs defined for the linearized white to cyan ramp 902 and the linearized white to magenta ramp 904 in the Y direction. Thus, the rightmost column of patches of the test areas 900 corresponds to an area coverage equidistant transition from a "pure" cyan to a "pure" magenta, and therefore enables selection of an NPac to map to the blue node in the RGB color space. Accordingly, the mapping module 114 may select a plurality of patches in the test areas 900 which approximate the white to blue color ramp, as shown by arrow 908 in FIG. 9. In some examples, selection of patches in the test areas 900 which approximate the white to blue color ramp may be performed manually by an operator. In other examples, the blue end point of the ramp may be selected computationally based on a particular characteristic, such as for hue.

Although the white to cyan color ramp 902 and the white to magenta color ramp 904 are linear in terms of lightness, the intermediate color ramps 906 are determined by an interpolation in NPac color space and thus are not necessarily linear in terms of lightness. Thus, the mapping module 114 may apply a linearization process to the NPac vectors corresponding to the patches selected for the white to blue color ramp 908 to ensure that the ramp is linear in terms of lightness. This process may be the same as that described above with reference to FIGS. 4 to 7. Once this process has been completed, the NPacs associated with the linearized white to blue color ramp may be used to populate the corresponding nodes in the data structure 112 (i.e. nodes corresponding to the white to blue edge 202-2 in the color space 200).

The techniques described above may also be applied to determine mappings corresponding to the white to green color ramp and white to red color ramp in the color space 200. In this case, the white to green color ramp may be determined based on the linearized white to yellow color ramp and the linearized white to cyan color ramp, and the white to red color ramp may be determined based on the linearized white to yellow color ramp and the linearized white to magenta color ramps, as determined according to the techniques discussed above with reference to FIGS. 4 to 7 (i.e. sub-process 1).

In some examples, the colorant deposition system 102 may provide deposition of one or more additional colorants, such as red, blue and green colorants. In such examples, the corresponding white to red, white to blue and white to green color ramps may be determined according to the techniques disclosed above with reference to FIGS. 4 to 7 (i.e. sub-process 1). In some examples, a color ramp determined in this manner may be used in the process described above with reference to FIG. 8 to determine a color ramp combining three colorants. For example, in the case of a white to blue color ramp, the test areas 900 may be determined by interpolating between the linearized white to cyan, the linearized white to blue and the linearized white to magenta color ramps. In such cases, the interpolation may also account for hue to ensure a constant hue ramp and avoid hue-shifts due to the multiple colorants involved.

In some examples, generation of the color to black ramps (i.e. sub-process 3) may be performed by printing area coverage linear transitions from each color to black. For example, a cyan to black color ramp may be generated by combining the NPac vector corresponding to the black end point of the black to white ramp with the NPac vector corresponding to the cyan end point of the white to cyan ramp. This combination may be achieved by applying a weighting function to the NPac vectors corresponding to the black end point and the cyan end point. In some examples, the weighting function may vary linearly from [1, 0] for [black, cyan] at the black end point of the cyan to black ramp, to [0, 1] for the cyan end point of the cyan to black ramp (i.e. an equally spaced area coverage convex combination of the NPac vectors for the black end point and the cyan end point). In this manner, the cyan to black ramp comprises a first end point corresponding to the black end point of the black to white ramp and a second end point corresponding cyan end point of the white to cyan ramp, with the NPac vectors for the black end point and the cyan end point being "blended" in proportion for the intermediate points in the cyan to black ramp. Again, these ramps are linear in NPac color space but are not necessarily linear in terms of lightness. Accordingly, a linearization process may be used to ensure that the ramps are linear in terms of lightness, as discussed above with reference to FIGS. 4 to 9. The linearized color to black ramps may be used to populate the corresponding nodes in the data structure 112. At this point, a linearization function may be used to populate all remaining nodes in the data structure 112 by interpolating between the white to color ramps and the color to black ramps.

Figure 10:
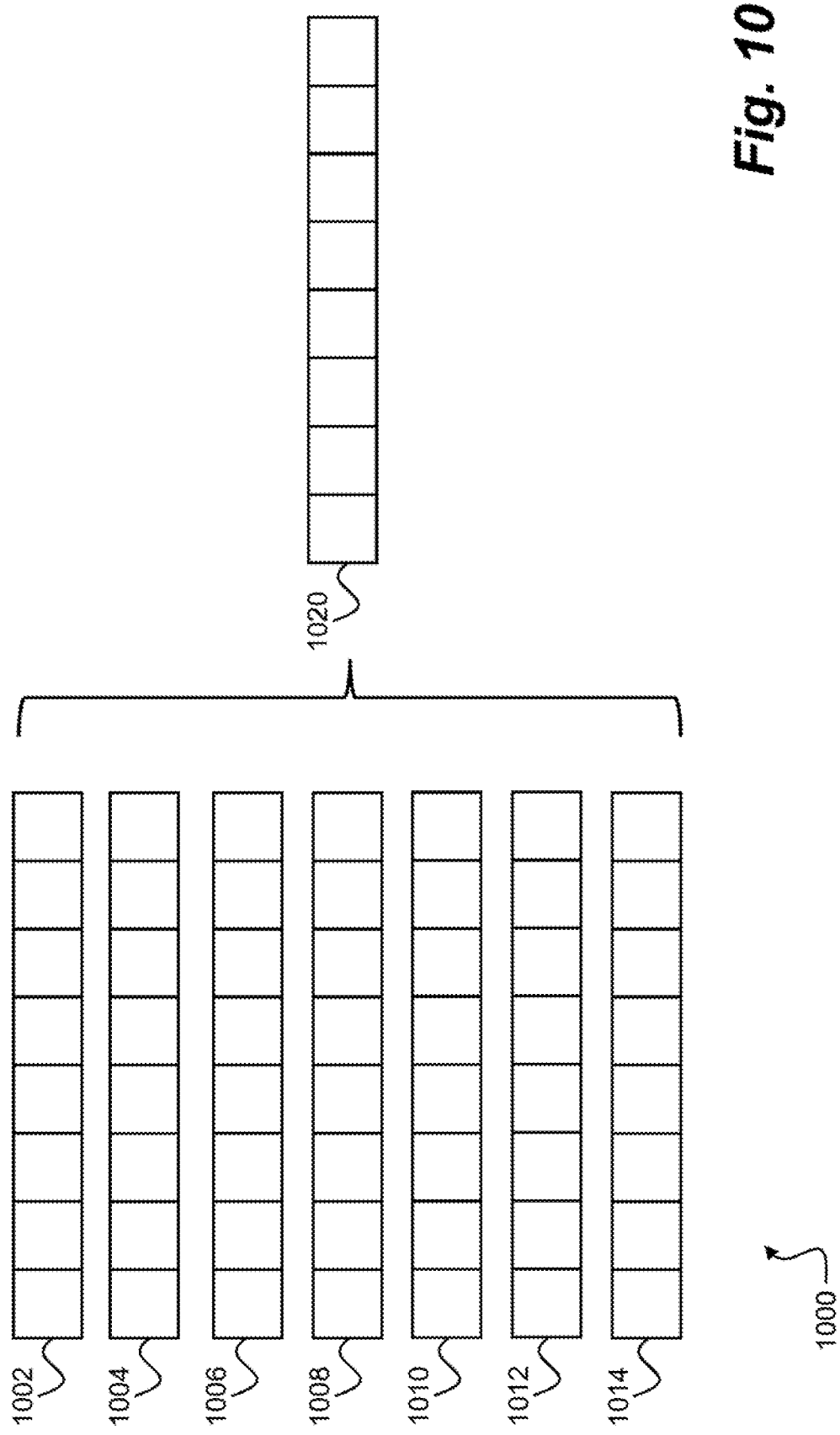
FIG. 10 is a schematic diagram showing a plurality of supplementary color ramps in accordance with an example.

The color to black ramps resulting from the process described above comprise combinations of the NPs defined for the color and black end points. In other examples, generation of the color to black ramps may be performed by generating and printing a number of supplementary ramps, which are subsequently combined to form each color to black ramp, thereby expanding the range of NPs available for use in the color to black ramps. In this respect, FIG. 10 shows an example of a plurality of test areas 1000 printed by the colorant deposition system 102 for use in populating nodes on the cyan to black face diagonal 202-3 in the color space 200 shown in FIG. 2 (i.e. sub-process 3). In some examples, the plurality of test areas 1000 may comprise one or more supplementary ramps 1002, 1004, 1006 and 1008 selected from the following supplementary ramps:

A first supplementary ramp 1002 may be generated by combining the NPac vector corresponding to the black end point of the black to white ramp with the NPac vector corresponding to the cyan end point of the white to cyan ramp. As discussed above, this combination may be achieved by applying a weighting function to the NPac vectors corresponding to the black end point and the cyan end point. In some examples, the weighting function may vary linearly from [1, 0] for [black, cyan] at the black end point of the first supplementary ramp 1002, to [0, 1] for the cyan end point of the first supplementary ramp 1002 (i.e. an equally spaced area coverage convex combination of the NPac vectors for the black end point and the cyan end point). In this manner, the first supplementary ramp 1002 comprises a first end point corresponding to the black end point of the black to white ramp and a second end point corresponding cyan end point of the white to cyan ramp, with the NPac vectors for the black end point and the cyan end point being "blended" in proportion for the intermediate points in the first supplementary ramp 1002.

A second supplementary ramp 1004 may be generated by combining the black to white ramp with the cyan end point from the white to cyan ramp. This combination may be achieved by applying a weighting function to the NPac vectors corresponding to each position in the white to black ramp and the NPac vector for cyan end point. In some examples, the weighting function may vary linearly from [1, 0] for [black, cyan] at the black end point of the second supplementary ramp 1004, to [0, 1] for the cyan end point of the second supplementary ramp 1004. In this manner, the second supplementary ramp 1004 comprises a first end point corresponding to the NPac vector for the black end point of the black to white ramp and a second end point corresponding the NPac vector for the cyan end point of the white to cyan ramp, with intermediate positions in the second supplementary ramp 1004 comprising a "blended" combination of the NPac vector for the corresponding position in the black to white ramp and the NPac vector for the cyan end point.

A third supplementary ramp 1006 may be generated by combining the white to cyan ramp with the black end point from the white to black ramp, in a similar manner that described above for the second supplementary ramp 1004. This combination may be achieved by applying a weighting function to the NP vectors corresponding to each position in the white to cyan ramp and the NPac vector for the black end point. In some examples, the weighting function may vary linearly from [1, 0] for [black, cyan] at the black end point of the third supplementary ramp 1006, to [0, 1] for the cyan end point of the third supplementary ramp 1006. In this manner, the third supplementary ramp 1006 comprises a first end point corresponding to the NPac vector for the black end point of the black to white ramp and a second end point corresponding to the NPac vector for the cyan end point of the white to cyan ramp, with intermediate positions in the third supplementary ramp 1006 comprising a "blended" combination of the NPac vector of the corresponding position in the white to cyan ramp and the NPac vector for the black end point.

A fourth supplementary ramp 1008 may be generated by combining the NPac vectors for white to cyan ramp with the NPac vectors for the black to white ramp. These ramps may be combined by applying a weighting function to the NPac vectors corresponding to white to cyan ramp and the black to white ramp. In some examples, the weighting function may vary linearly from [1, 0] for [cyan, black] at the cyan end of the fourth supplementary ramp 1008, to [0, 1] for the black end of the fourth supplementary ramp 1008. In this manner the fourth supplementary ramp 1008 comprises a first end point corresponding to NPac vector for the cyan end point of the white to cyan ramp and a second end point corresponding to the NPac vector black end point of the black to white ramp, with intermediate positions in the fourth supplementary ramp 1008 comprising a "blended" combination of the NPac vector of the corresponding position in the white to cyan ramp and the NPac vector for the corresponding position in the black to white ramp.

A fifth supplementary ramp 1010 may be generated by combining the NPac vectors for the white to cyan ramp with the NPac vectors for the black to white ramp, and applying a normalization function. These ramps may be combined by summing or "stacking" the corresponding NPac vectors for the white to cyan ramp and the black to white ramp at each position in the fifth supplementary ramp 1010. The normalization process may include scaling the resting combined NPac vectors to ensure that the corresponding area coverage is equal to 1 and further scaling the area coverage of the non-blank NPs in the combined NPac vector as far as possible towards the printing fluid limit, at the expense of the white or blank NP (where present). In other words, the area coverages of the non-blank NPs defined in the combined NPac vector are increased in proportion to preserve their relative ratios, whilst the area coverage of the white NP is decreased to ensure that the total area coverage does not exceed 1.

A sixth supplementary ramp 1012 may be generated by combining the white to cyan ramp with the one or more NP combinations defined in the black to white ramp, scaled to reach the printing fluid limit for the print medium. In other words, the white to cyan ramp may be combined separately with each of the one of more NP combinations defined in the black to white ramp. In examples where the white to black ramp comprises multiple NP combinations (i.e. multiple NPac vectors defining different NP combinations), a plurality of sixth supplementary ramps 1012 may be generated accordingly. In this manner, the sixth supplementary ramp 1012 is generated by "supplementing" each position in the white to cyan ramp with the maximum quantity of black colorant which can be deposited without exceeding the printing fluid limit, to be deposited using the NP combination defined in the black to white ramp.

A seventh supplementary ramp 1014 may be generated by combining the cyan end point from the white to cyan ramp with the one or more NP combinations defined in the black to white ramp, scaled to reach the printing fluid limit for the print medium. In other words, the white to cyan ramp may be combined separately with each of the one of more NP combinations defined in the black to white ramp. In examples where the white to black ramp comprises multiple NP combinations (i.e. multiple NPac vectors defining different NP combinations), a plurality of seventh supplementary ramps 1014 may be generated accordingly. In this manner, the seventh supplementary ramp 1014 is generated by scaling the cyan end point to create a white to cyan ramp and "supplementing" each position with the maximum quantity of black colorant which can be deposited without exceeding the printing fluid limit, to be deposited using the NP combination defined in the black to white ramp.

The mapping module 114 is configured to combine patches from one or more of the above supplementary ramps 1000 on the basis of one or more metrics, as discussed above, to generate a composite cyan to black ramp 1020. Again, the resulting composite cyan to black ramp 1020 is not necessarily linear in terms of lightness, so the mapping module 114 may perform a linearization process in NPac color space to ensure linear variation in lightness for the composite ramp. Once this process has been completed, the NPacs associated with the linearized cyan to black color ramp may be used to populate the corresponding nodes in the data structure 112 (i.e. nodes corresponding to the cyan to black face diagonal 202-3 in the color space 200).

In some examples, generation of the color to color ramps (i.e. sub-process 4) may be performed by printing area coverage linear transitions from respective end points of the color to color ramp. As discussed above, the resulting ramps are linear in NPac color space but are not necessarily linear in terms of lightness. Accordingly, a linearization process may be used to ensure that the ramps are linear in terms of lightness, as discussed above with reference to FIGS. 4 to 9. The linearized color to color ramps may be used to populate the corresponding nodes in the data structure 112 (e.g. nodes corresponding to the magenta to red edge 202-4 in the color space 200).

In other examples, generation of the color to color ramps may be performed by generating and printing a plurality of supplementary ramps, in a similar manner to that described above with reference to FIG. 10 in relation to the color to black ramps (i.e. sub-process 3). In such examples, the plurality of supplementary ramps may be generated according to the first to seventh supplementary ramps 1002 to 1014 described above with reference to FIG. 10, wherein the black color ramp is substituted for the a second color for the color to color ramp. Once printed, the plurality of supplementary ramps are measured and combined to form a composite color to color ramp based on one or more metrics, as discussed above. Finally, a linearization process may be used to ensure that the composite color ramp is linear in terms of lightness. The linearized color to color ramps may be used to populate the corresponding nodes in the data structure 112 (e.g. nodes corresponding to the magenta to red edge 202-4 in the color space 200).

Figure 11:
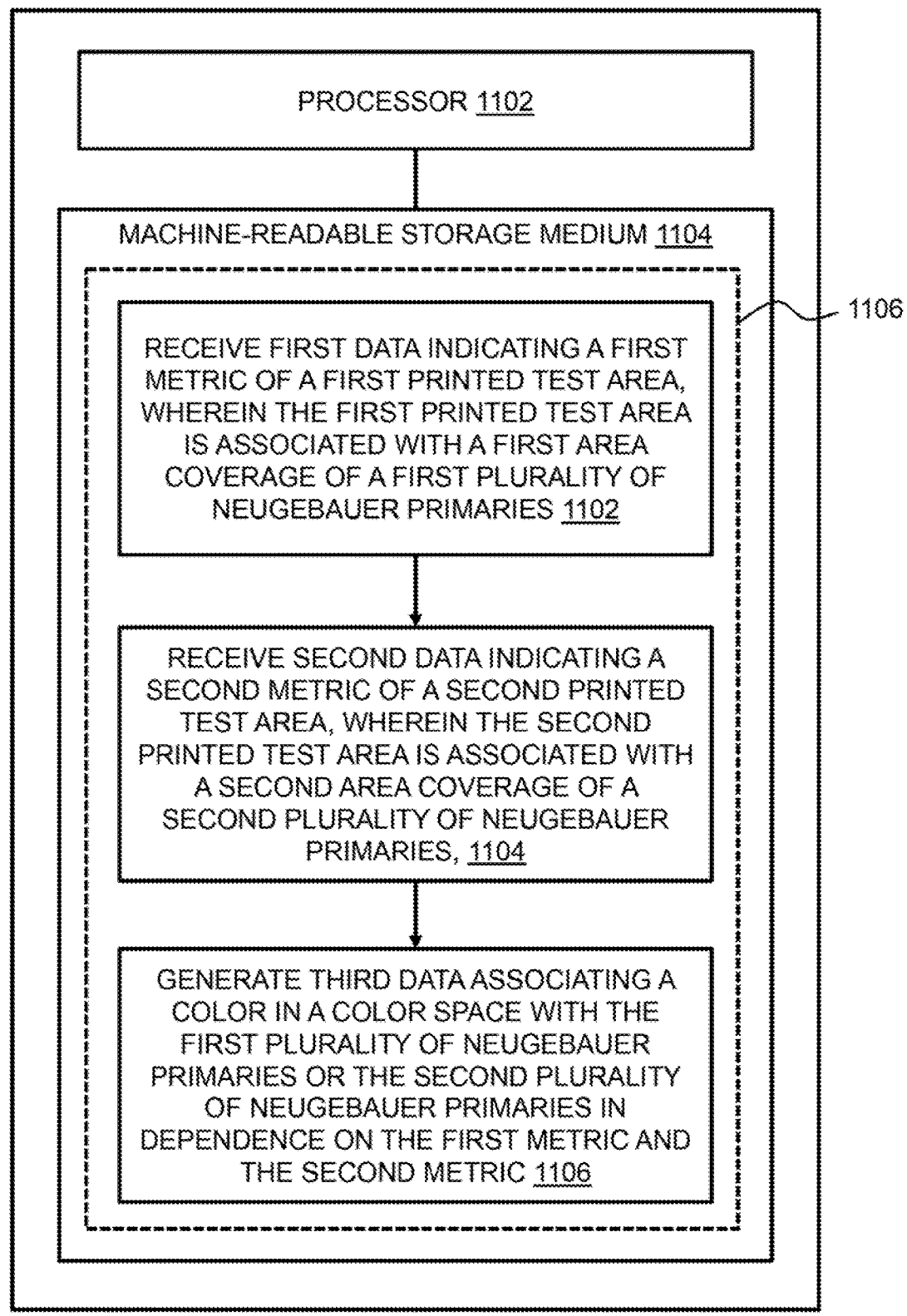
FIG. 11 is a schematic diagram showing a computer device in accordance with an example.

FIG. 11 shows an example of a computer device 1100, including a processor 1102 and a machine-readable storage medium 1104. The machine-readable storage medium includes instructions 1106 which, when executed by the processor 1102, cause the computer device 1100 to perform a method according to examples described herein. For example, the instructions 1106 may cause the computer device 1100 to perform one of the methods described above with reference to FIGS. 1 to 10. In this respect, the processor 1102 may form part of the printing system 100 described above with reference to FIG. 1. The instructions 1106 may be retrieved from a machine-readable media (e.g. any media that can contain, store, or maintain programs and data for use by or in connection with an instruction execution system), In this case, the machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In some examples, the machine-readable storage medium 1104 may include instructions 1106 which cause the computer device 1100 to receive first data indicating a first metric of a first printed test area, wherein the first printed test area is associated with a first plurality of NPs, wherein each NP in the first plurality of NPs is associated with a respective area coverage in the first printed test area (block 1102). The instructions may further cause the computing device 1100 to receive second data indicating a second metric of a second printed test area, wherein the second printed test area is associated with second plurality of NPs, wherein each NP in the second plurality of NPs is associated with a respective area coverage in the second printed test area, and the second plurality of NPs is different from the first plurality of NPs (block 1104). The computer device 1100 may further generate third data associating a color in a color space with the first plurality of NPs or the second plurality of NPs in dependence on the first metric and the second metric (block 1106).

In some examples, the first and second metrics indicated by the first and second data respectively may be based on a halftone characteristic of the first and second printed areas. For example, the first and second metrics may be characteristic of the degree of side-by-side printing of for pixels in the first and second printed areas respectively.

In some examples, the first and second printed test areas may be associated with a multi-level and/or mufti-stage printing system. In such examples, each NP in the first plurality of NPs and the second combination of NPs may specify a colorant deposition stage (e.g. a particular printbar) in a plurality of colorant deposition stages for deposition of a colorant, and/or a colorant deposition level (e.g. a drop-weight) in a plurality of colorant deposition levels for deposition of a colorant.

The preceding description has been presented to illustrate and describe examples of the principles described. This description is not intended to be exhaustive or to limit these principles to any precise form disclosed. Many modifications and variations are possible in light of the above teaching.

What is claimed is:

1. A non-transitory computer-readable storage medium comprising computer-executable instructions which, when executed by a processor, cause a computing device to:

receive first data indicating a first metric of a first printed test area, wherein the first printed test area is associated with a first plurality of Neugebauer Primaries, and each Neugebauer Primary in the first plurality of Neugebauer Primaries is associated with a respective area coverage in the first printed test area;

receive second data indicating a second metric of a second printed test area, wherein the second printed test area is associated with a second plurality of Neugebauer Primaries, and each Neugebauer Primary in the second plurality of Neugebauer Primaries is associated with a respective area coverage in the second printed test area, and the second plurality of Neugebauer Primaries is different from the first plurality of Neugebauer Primaries; and generate third data associating a color in a color space with the first plurality of Neugebauer Primaries or the second plurality of Neugebauer Primaries in dependence on the first metric and the second metric.

2. The non-transitory computer-readable storage medium of claim 1, wherein the first metric and the second metric are based on a halftone characteristic of the first printed test area and the second printed test area respectively.

3. The non-transitory computer-readable storage medium of claim 1, wherein each Neugebauer Primary in the first plurality of Neugebauer Primaries and the second plurality of Neugebauer Primaries specifies a colorant deposition stage in a plurality of colorant deposition stages for deposition of a colorant.

4. The non-transitory computer-readable storage medium of claim 3, wherein each colorant deposition stage in the plurality of colorant deposition stages corresponds to a respective print-bar in a plurality of print-bars.

5. A method comprising:
   printing, with a printing system, a first plurality of test areas, wherein each test area in the first plurality of test areas corresponds to a respective area coverage of a first Neugebauer Primary;
   printing, with the printing system, a second plurality of test areas, wherein each test area in the second plurality of test areas corresponds to a respective area coverage of a second Neugebauer Primary, the second Neugebauer Primary being different from the first Neugebauer Primary;
   selecting, from the first plurality of test areas and the second plurality of test areas, a third plurality of test areas which approximates a color ramp, wherein the third plurality of test areas includes a first test area from the first plurality of test areas and a second test area from the second plurality of test areas;
   generating data associating a first color in a color space with the first Neugebauer Primary and a first area coverage corresponding to the first test area and a second color in the color space with the second Neugebauer Primary and a second area coverage corresponding to the second test area.

6. The method of claim 5, wherein the third plurality of test areas is selected from the first plurality of test areas and the second plurality of test areas based on a measured property of each test area in the first plurality of test areas and the second plurality of test areas.

7. The method of claim 6, wherein the measured property is a halftone characteristic of each test area in the first plurality of test areas and the second plurality of test areas.

8. The method of claim 5, wherein the first Neugebauer Primary and the second Neugebauer Primary each specify a colorant deposition level in a plurality of colorant deposition levels for deposition of a colorant.

9. The method of claim 8, wherein each colorant deposition level in the plurality of colorant deposition levels corresponds to a respective drop-weight in a plurality of drop-weights.

10. The method of claim 5, comprising applying a linearization process to the third plurality of test areas to determine the first area coverage and the second area coverage.

11. The method of claim 10, wherein the linearization process comprises linearizing a lightness characteristic of each test area in the third plurality of test areas to determine the first area coverage and the second area coverage.

12. A computer device comprising:
   a processor; and
   a memory storing computer-executable instructions which, when executed by the processor, cause the computer device to:
   generate first data representing a first plurality of Neugebauer Primary area coverage (NPac) vectors for a first plurality of nodes in a multi-dimensional color space, wherein the first plurality of nodes are located on a first plurality of edges of the multi-dimensional color space and each edge in the first plurality of edges comprise a first vertex in the multi-dimensional color space which represents white; and
   generate, based on the first data, second data representing a second plurality of NPac vectors for a second plurality of nodes in the multi-dimensional color space, wherein the second plurality of nodes are located on a first plurality of diagonals of the multi-dimensional color space and each diagonal in the first plurality of diagonals comprises the first vertex in the multi-dimensional color space which represents white.

13. The computer device of claim 12, wherein the computer-executable instructions, when executed by the processor, cause the computer device to:
   generate, based on the first data and the second data, third data representing a third plurality of NPac vectors for a third plurality of nodes in the multi-dimensional color space, wherein the third plurality of nodes are located on a second plurality of edges of the multi-dimensional color space and each edge in the second plurality of edges comprises a second vertex in the multi-dimensional color space which represents black.

14. The computer device of claim 12, wherein the computer-executable instructions, when executed by the processor, cause the computer device to:
   generate, based on the first data and the second data, fourth data representing a fourth plurality of NPac vectors for a fourth plurality of nodes in the multi-dimensional color space, wherein the fourth plurality of nodes are located on a second plurality of diagonals of the multi-dimensional color space and each diagonal in the second plurality of diagonals comprises the second vertex in the multi-dimensional color space which represents black.

15. The computer device of claim 12, wherein the multi-dimensional color space is a three dimensional color space with dimensions representing red, green and blue.

16. The computer device of claim 12, wherein each NPac vector in the first plurality of NPac vectors and the second plurality of NPac vectors specifies a Neugebauer Primary, the Neugebauer Primary specifying a colorant deposition level in a plurality of colorant deposition levels for deposition of a colorant.

* * * * *